Oct. 22, 1968   R. J. WILCOX   3,406,548
METHOD AND APPARATUS FOR MAKING WHEEL RIMS
Filed Nov. 2, 1965   9 Sheets-Sheet 1
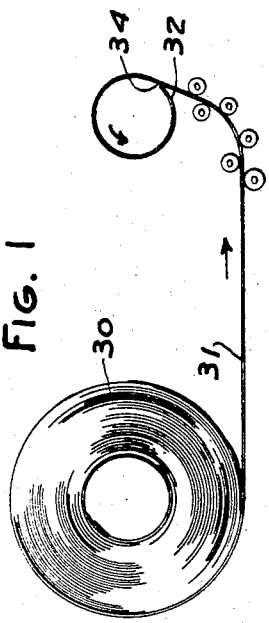
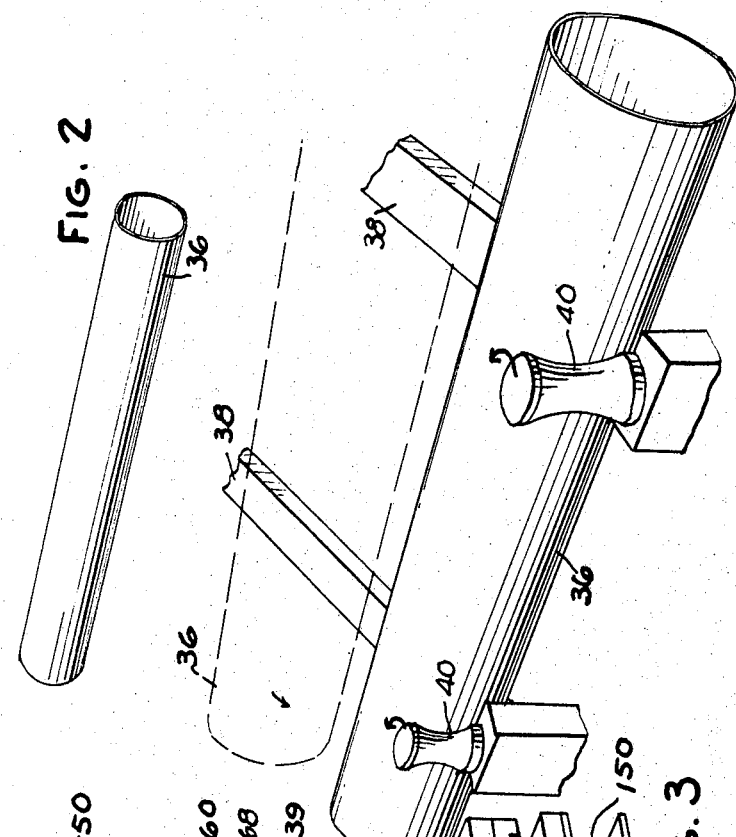
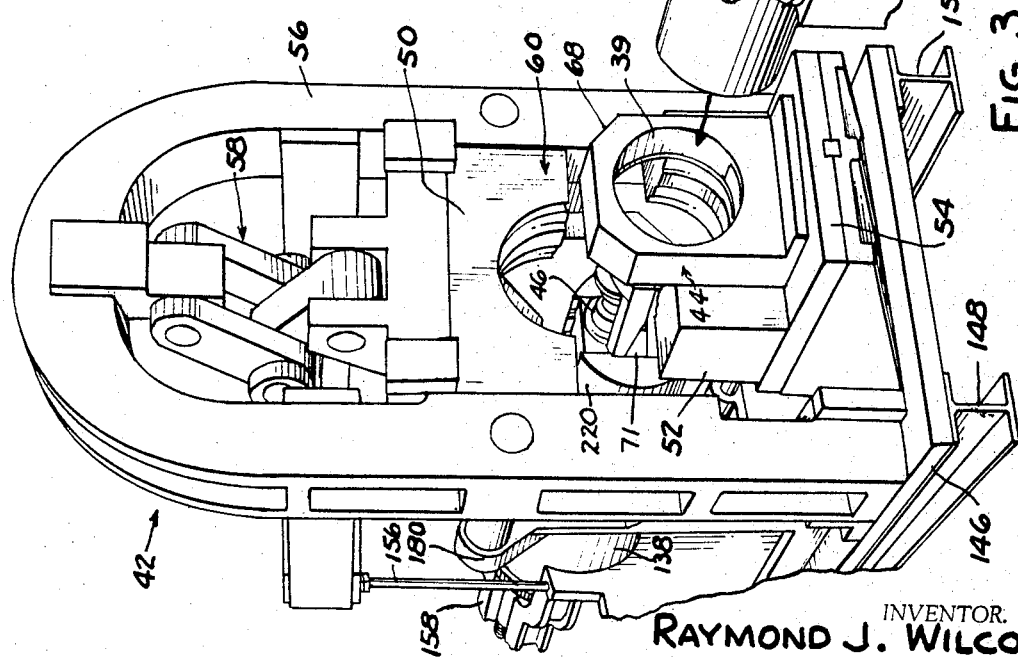
INVENTOR.
RAYMOND J. WILCOX
BY
Berman, Kiselle, Raisch & Choate
ATTORNEYS Oct. 22, 1968 R. J. WILCOX 3,406,548
METHOD AND APPARATUS FOR MAKING WHEEL RIMS
Filed Nov. 2, 1965 9 Sheets-Sheet 2
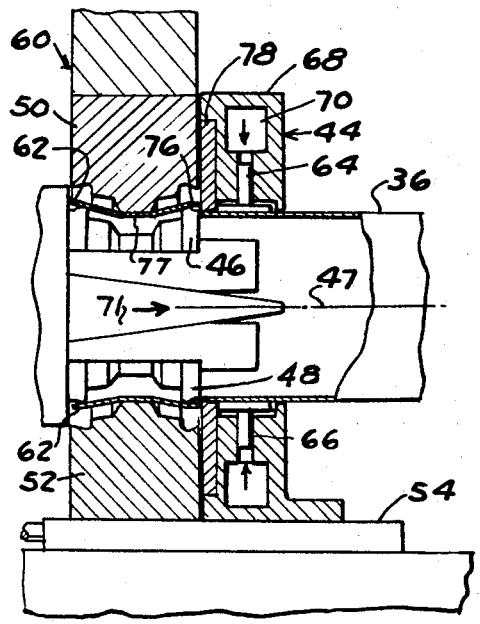
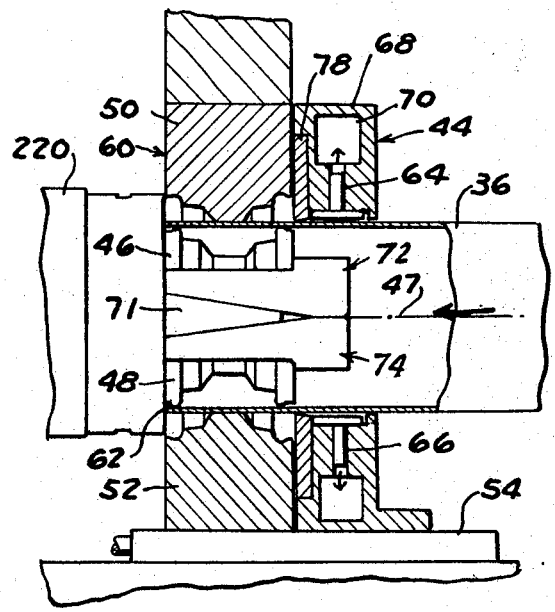
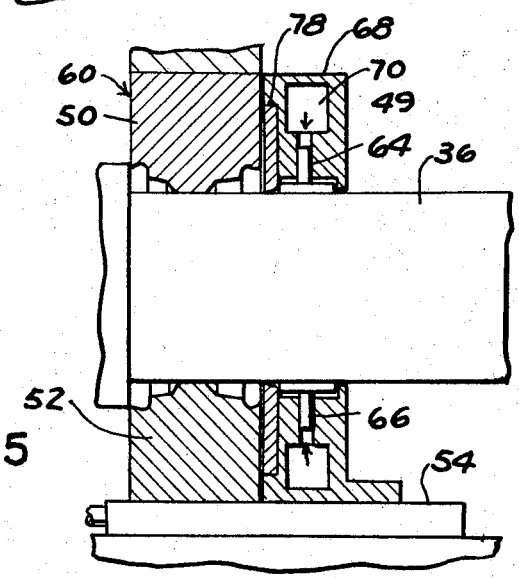
INVENTOR.
RAYMOND J. WILCOX
BY
Barnes, Kisselle, Raisch & Choate
ATTORNEYS FIG. 10A   FIG. 10B   FIG. 10C
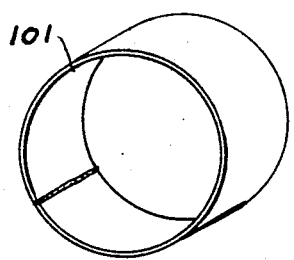
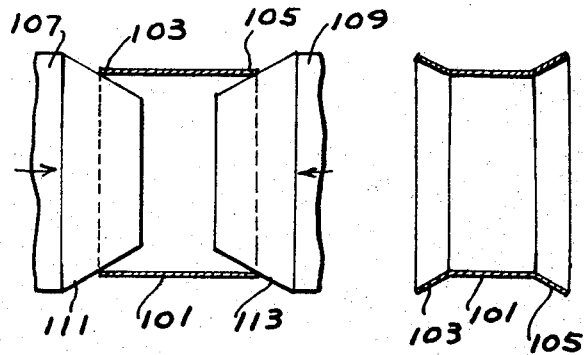
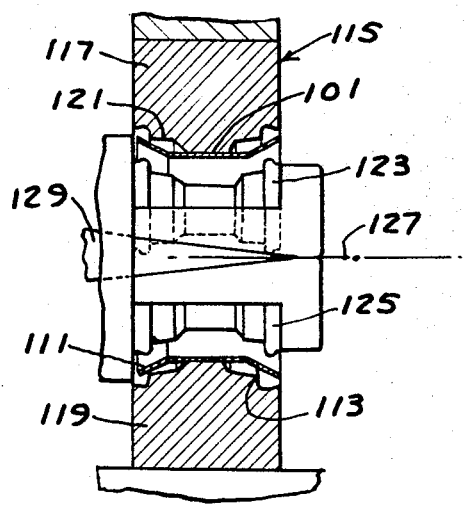
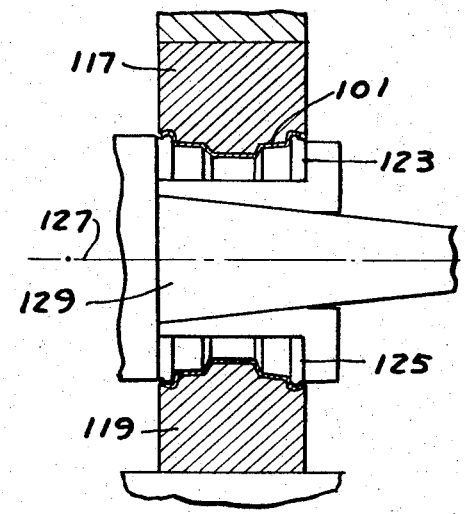
FIG. 10D   FIG. 10E
RAYMOND J. WILCOX *INVENTOR.*

INVENTOR.
RAYMOND J. WILCOX
BY
Barnes, Kisselle, Raisch & Choate
ATTORNEYS

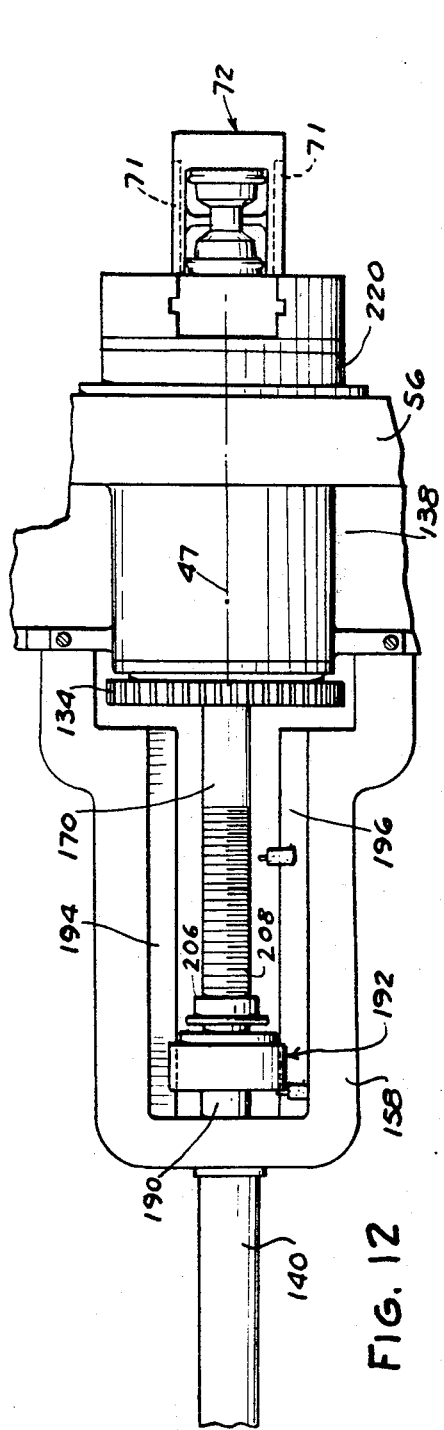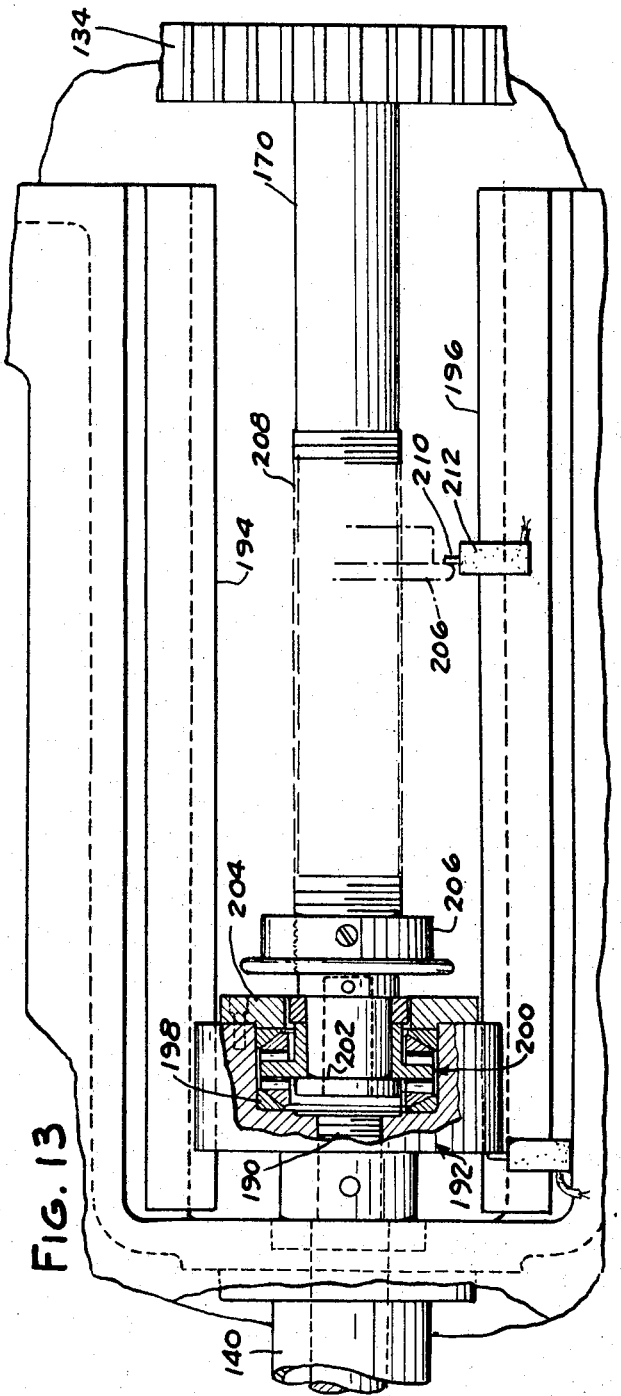

INVENTOR.
RAYMOND J. WILCOX
BY
ATTORNEYS

INVENTOR.
RAYMOND J. WILCOX
BY
Barnes, Kisselle, Raisch & Choate
ATTORNEYS

INVENTOR.
RAYMOND J. WILCOX
BY
ATTORNEYS

United States Patent Office 3,406,548
Patented Oct. 22, 1968

3,406,548
METHOD AND APPARATUS FOR MAKING
WHEEL RIMS
Raymond J. Wilcox, Bloomfield Hills, Mich., assignor to
Motor Wheel Corporation, Lansing, Mich., a corporation of Ohio
Filed Nov. 2, 1965, Ser. No. 506,081
5 Claims. (Cl. 72—71)

ABSTRACT OF THE DISCLOSURE

A method and machine for manufacturing wheel rims in which a rim blank, in the form of a tube having a length in excess of that required to form a wheel rim, is fed endwise into an opened die adapted to encompass the exterior of the blank and contoured when closed to impart the desired exterior rim contour to the blank when the blank is roll formed against the internal forming surface of the die. A shearing die is also provided which closely encircles the leading end of the blank adjacent the entrance side of the forming die. A plurality of freely rotatable form rolls are expanded from inside the blank as they are revolved about the axis of the blank to thereby expand the blank, causing it to be first severed as it expands past the cutting edge of the shearing die, thus cutting off a portion of the blank to the proper length for formation into a wheel rim, and then causing the severed portion to be further expanded as it is roll formed against the forming surface of the forming die into a semi-finished or finished wheel rim.

---

This invention relates to a method and machine for manufacturing wheel rims by a metal forming operation.

It is an object of this invention to improve on the known methods of manufacturing wheel rims by metal forming using one or more rolling dies and an annular die.

Another object is to provide in a machine for manufacturing wheel rims by metal forming an improved mechanism for moving revolving rolling dies outwardly against the interior of a tubular metal blank and toward an outer die encircling the rolling dies to roll form the tube into a wheel rim, but which mechanism does not contact the rolling die or dies.

Still another object is to provide an improved method of making wheel rims which is rapid, economical, provides high uniformity in rims made by the method and imparts superior characteristics to the rims.

Other objects, features and advantages of the present invention will become apparent from the following detailed description taken in conjunction with the accompanying drawings wherein:

FIG. 1 schematically illustrates a first step of one embodiment of the method of the present invention wherein a coil of sheet metal is unwound and rolled into a tube.

FIG. 2 is a perspective view of the completed tube.

FIG. 3 is a fragmentary perspective view of the front of one embodiment of a wheel forming machine in accordance with the invention, and semi-schematically illustrating feed of a tubular metal blank to the dies of the machine.

FIG. 4, which is the first of a series of sectional views (FIGS. 4–9), shows the leading end of the tubular blank after it has been moved endwise through a cutting and clamping device into the annular space between a pair of rolling dies and a two piece outer die encircling the rolling dies.

FIG. 5 is a view similar to FIG. 4 showing the closed position of a clamp of the cutting and clamping device.

FIG. 6 shows the rolling dies being spread apart as they revolve by a wedge to expand and cut off the endmost portion of the tube located between the rolling dies and the outer die, thus providing a shorter tube to be formed into a wheel rim.

Figure 7:
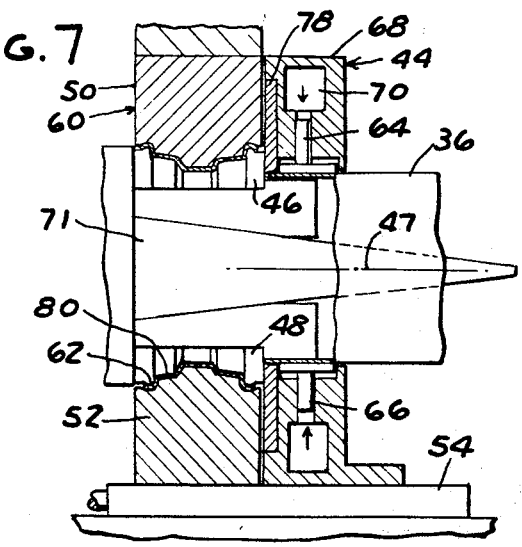

FIG. 7 shows the shorter tube in a final stage of forming wherein the metal of the tube has been expanded against the outer die and formed into a wheel rim.

Figure 8:
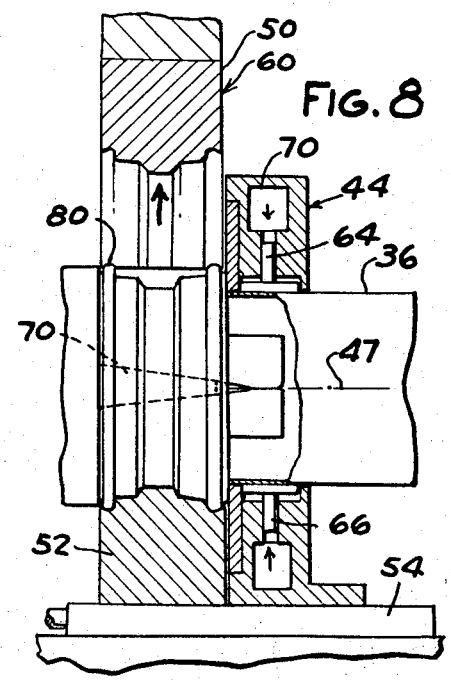

FIG. 8 illustrates the next step wherein the upper half of the outer die is raised to release the wheel rim.

Figure 9:
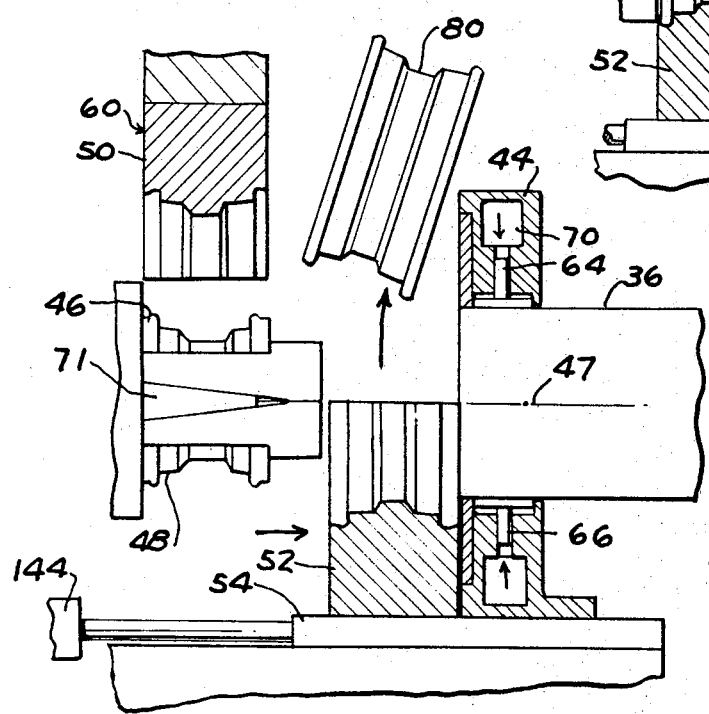

FIG. 9 shows the wheel rim being removed from the machine after the lower half of the outer die has been moved horizontally to the right to clear the rim from the rolling dies.

FIGS. 10A through 10E are a series of views illustrating some of the steps of another method embodiment of the invention.

Figure 11:
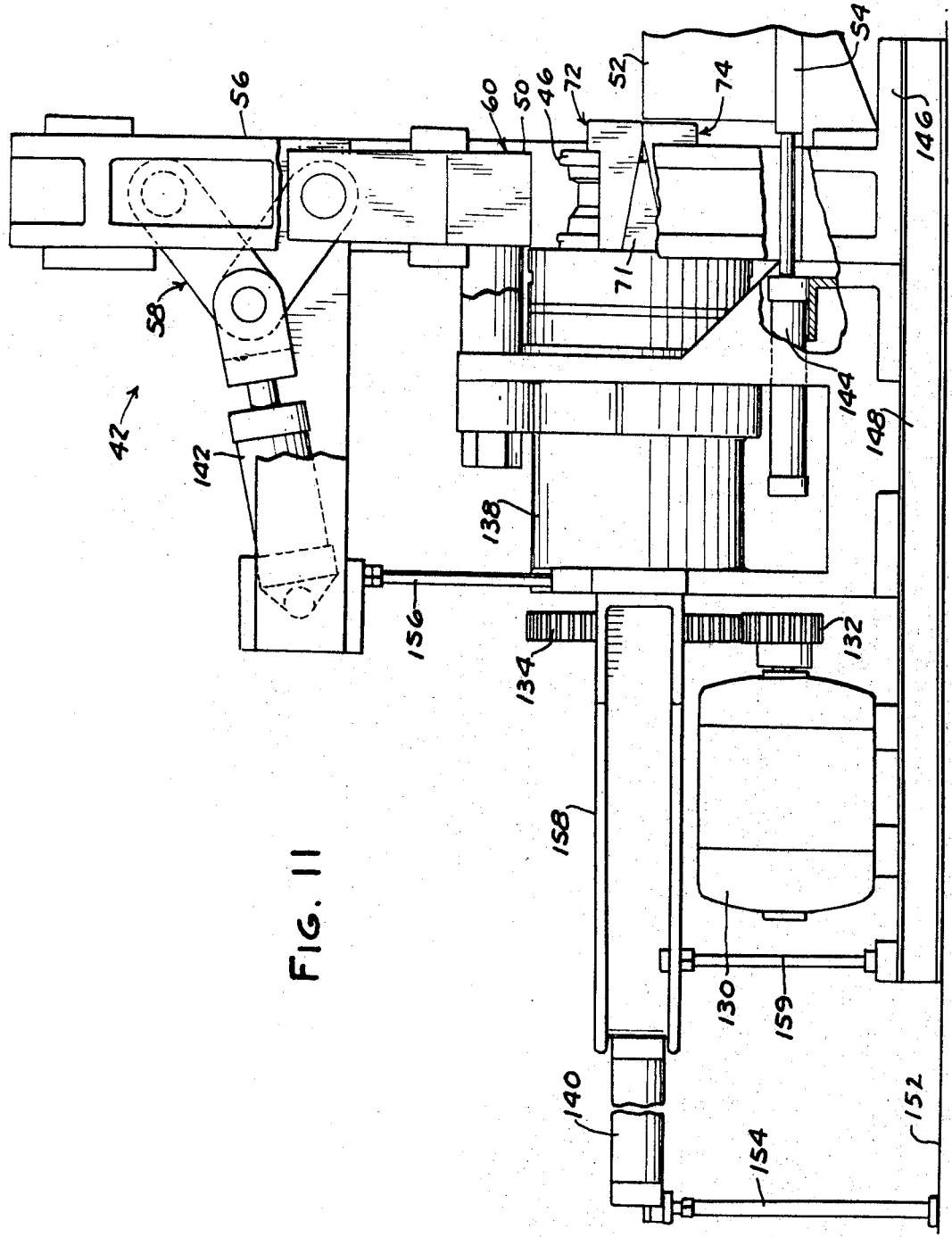

FIG. 11 is a side elevational view of the machine of FIG. 3, portions of the front part of the machine having been shown cut away in this view.

FIG. 12 is a fragmentary top plan view of the machine.

FIG. 13 is an enlarged top plan view of a portion of FIG. 12 with portions cut away to illustrate details of a ram and a shaft for reciprocating rotating and wedge.

Figure 14:
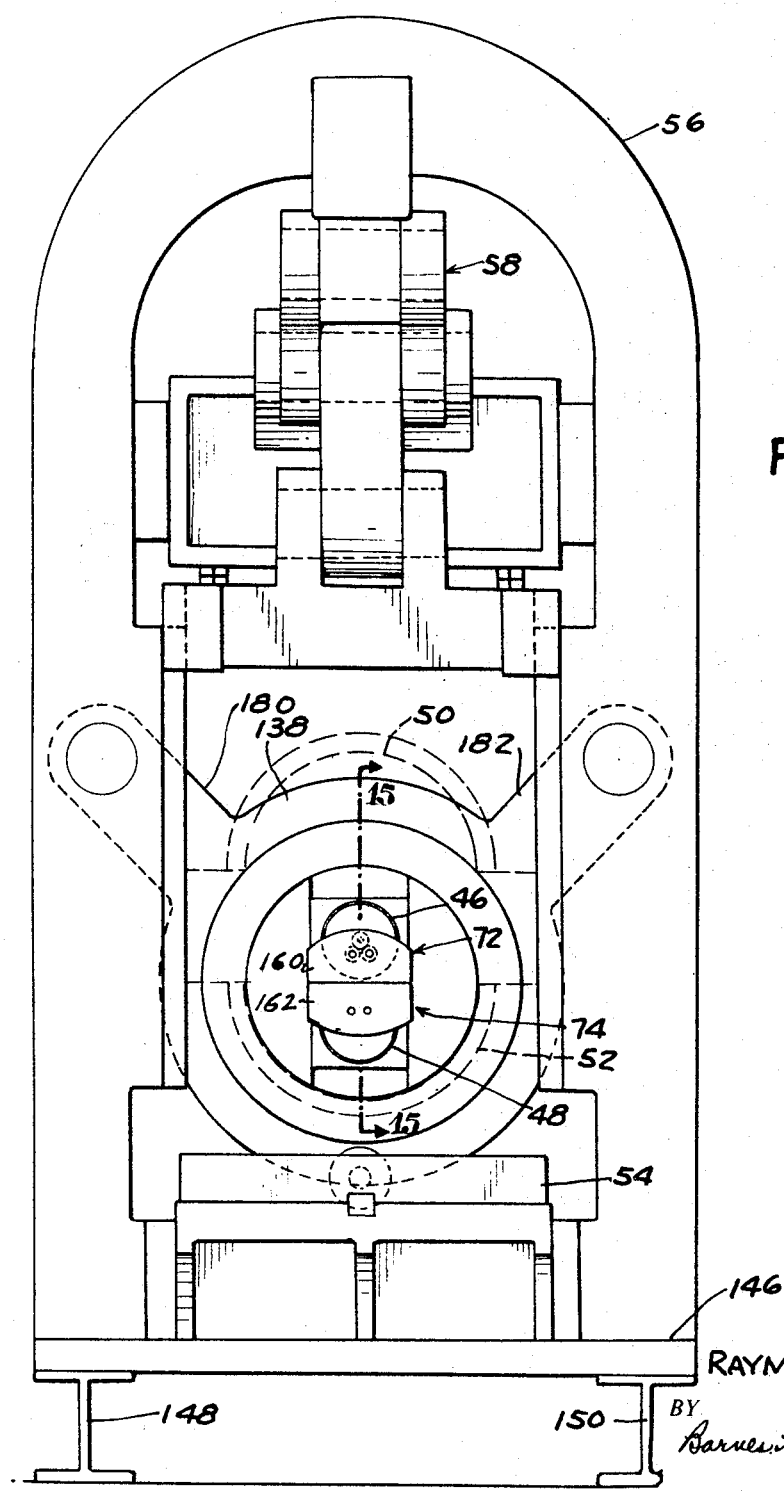

FIG. 14 is a front elevational view of the machine.

Figure 15:
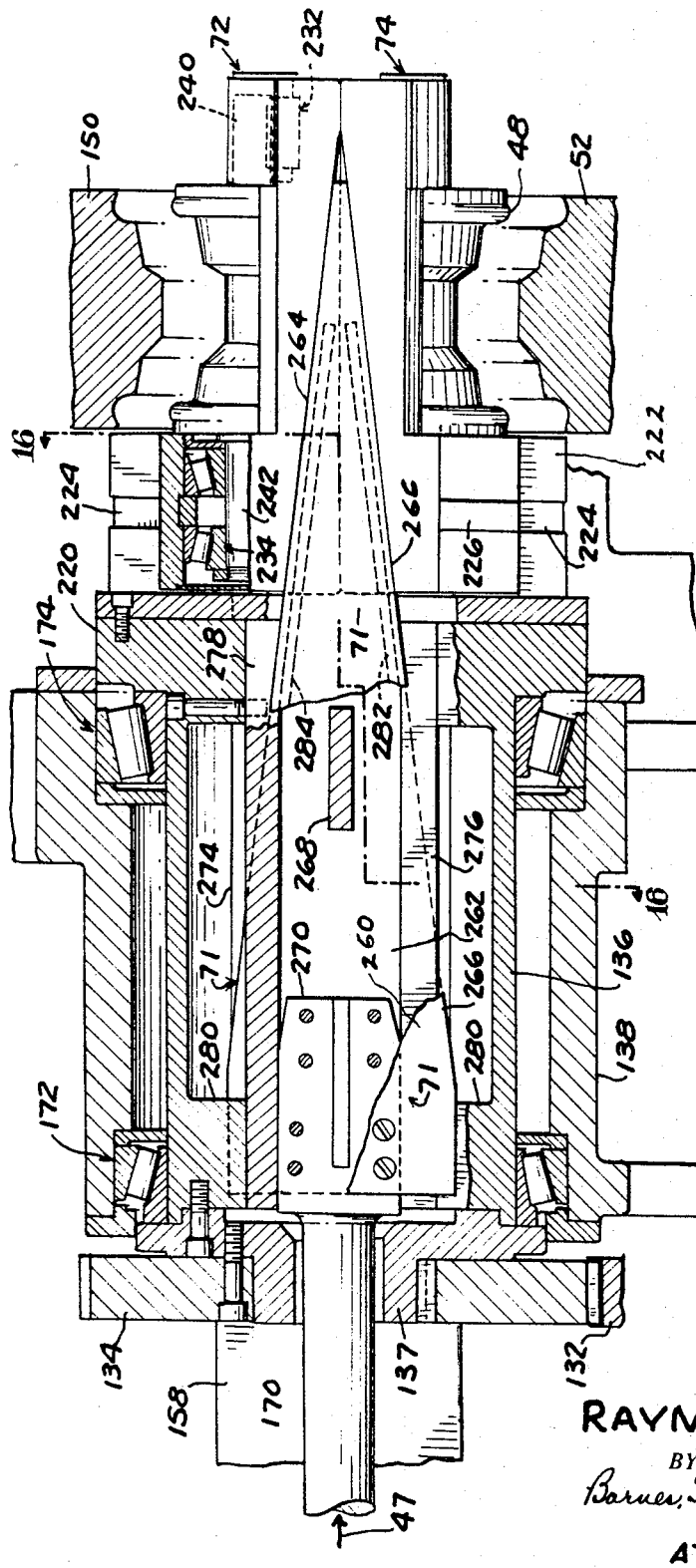

FIG. 15 is a vertical section of the operating mechanism of the machine taken along line 15—15 of FIG. 14 showing the outer and rolling dies, a wedge for moving the rolling dies away from their axis of revolution and a rotor for revolving the rolling dies about said axis.

Figure 16:
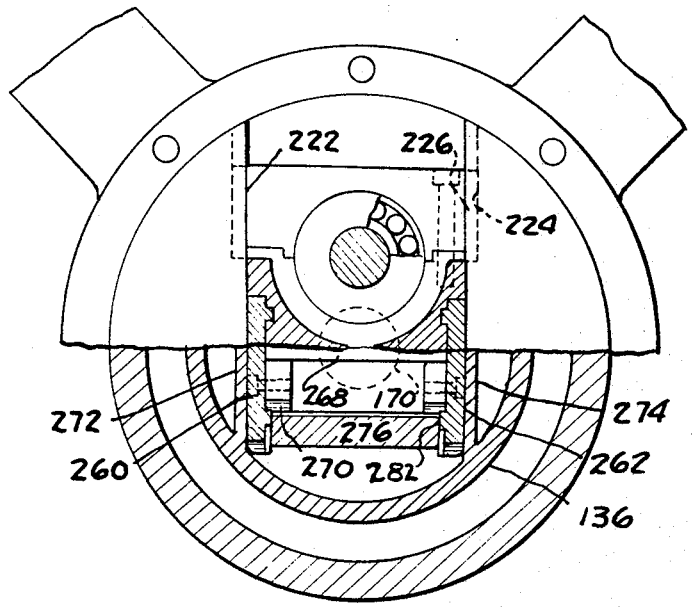

FIG. 16 is a sectional view taken along line 16—16 of FIG. 15.

Figure 17:
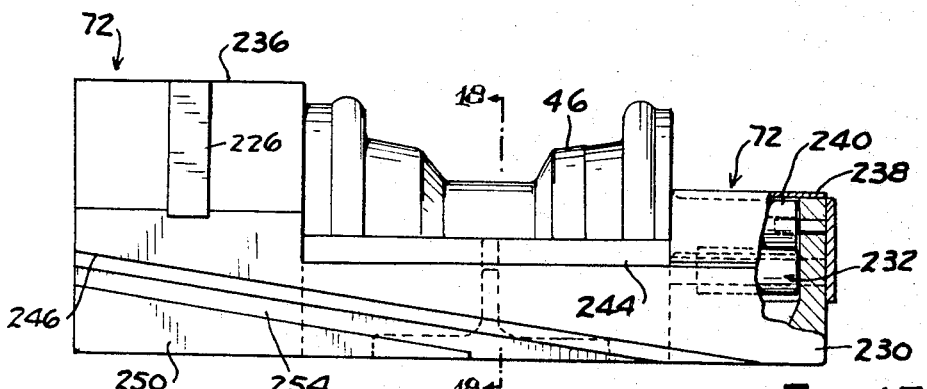

FIG. 17 is a side elevational view of a cage or basket which supports the rolling dies, there being an identical basket for the other rolling die.

Figure 18:
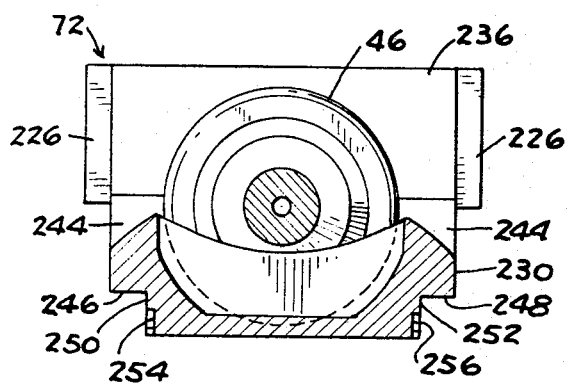

FIG. 18 is a sectional view of the basket taken on line 18—18 of FIG. 17.

One preferred method of making wheel rims in accordance with the invention is illustrated by FIGS. 1–9 and, although some parts of the machine are also shown in these figures, the preferred method will be described first with reference to the parts of the machine pertaining to that method.

FIG. 1 shows schematically the preliminary steps of unwinding a coil 30 of sheet steel and one method of making a tubular blank; i.e., by rolling a free end 32 of the strip stock 31 into a tubular shape which is then cut at 34, whereupon end 32 and cut end 34 are welded together to form a tubular metal blank 36 (FIG. 2) of constant diameter and of sufficient length, for example about fifteen feet, to permit several wheel rims to be made from one length of the same. Preferably, however, blank 36 is made in commercially available tube or pipe rolling mill apparatus generally of the type shown for example in United States Patents 3,170,427 and 3,181,333, wherein strip stock is fed lengthwise and its longitudinal edges progressively brought together and finally butt welded in one continuous sequential operation. The outside diameter of tube 36 is equal to or slightly less than the minimum outside diameter of a finished wheel rim.

In FIG. 3, tube 36 is shown in two positions as it rolls down a loading ramp formed by two inclined beams 38 to two driving capstans 40 which rotate counterclockwise to feed the tube to the wheel forming machine 42. Capstans 40 may be mounted on a suitable carriage (not shown) which in turn is connected to a slide or platform 54 of machine 42 for reciprocating movement therewith, the feed of tube 36 relative to a lower die block 52 of machine 42 being controlled by capstans 40. Tube 36 is fed through an opening 39 in a combined cutting and clamping device 44 to a die set composed of two rolling dies 46, 48 and a separable two piece outer die 60 comprising an upper die block 50 and the lower die block 52. Die blocks 50 and 52 are shown in an open condition wherein die block 50 is in a raised position and die block 52 is below and offset horizontally out in front of die block 50. Both die block 52 and the cutting and clamping device 44 are mounted on a platform 54 which is horizontally movable to position die block 52 directly under die block 50. Die block 50 is slidably keyed to a frame 56 for vertical movement and is raised and lowered by means of a toggle mechanism 58 connected between block 50 and the upper arch of frame 56.

FIG. 4 shows the relative positions of tube 36, dies 46, 48 and 60 and the cutting and clamping device 44 after platform 54 has been moved rearwardly into the machine and die block 50 has been lowered by toggle 58 onto die block 52 to thus close the two piece outer die 60 around tube 36 at an adjacent to its inner or leading end 62. The circumferential surfaces of rolling dies 46, 48 have an axial profile adapted for roll forming the inside contour of a wheel rim, and the inner cylindrical surface of outer die 60 has a profile matching the outside contour of the wheel rim. The inside and outside profiles of the final wheel rim ordinarily match, one being the inverse of the other, and in this case the profile is for a drop center wheel rim.

Device 44 (FIG. 4) includes clamping pistons 64 and 66 housed in an annular block 68 with a ring shaped chamber 70 containing hydraulic fluid for forcing the pistons against tube 36. Clamping pistons 64 and 66 are shown retracted clear of tube 36 in FIG. 4 and are shown in their actuated tube clamping positions in FIG. 5.

After tube 36 has been loaded endwise and clamped in die 60, a planetary expansion motion is imparted to dies 46, 48, i.e., the dies are revolved about an axis 47 while freely rotating about their individual axes and are simultaneously moved radially away from axis 47, as illustrated in sequence in FIGS. 4, 6 and 7. Axis 47 is parallel to the axes of the rolling dies 46 and 48 and is coincident with the axes of annular die 60 and tube 36. Preferably, this motion is imparted to dies 46, 48 by a spindle and crosshead mechanism which carries a pair of cages 72 and 74 in which dies 46 and 48 are respectively supported as described in detail hereinafter in conjunction with FIGS. 11–18. Cages 72 and 74 revolve about axis 47 and each carry a shaft on which the associated die 46, 48 is freely rotatable. Referring to FIGS. 4–9, a reciprocating wedge 71 moves axially of dies 46, 48 (as shown in sequence in FIGS. 4–7) slidably between and in positive engagement with the cages to spread the cages apart and thereby expand the rolling dies away from axis 47. Wedge 71 is also rotated by the spindle and crosshead mechanism and hence there is no relative rotating motion between the wedge, cages 72, 74 and rolling dies 46, 48. As dies 46, 48 revolve they are rotated about their journal shaft axes due to their frictional rolling engagement with the inner surface of tube 36 (FIG. 5), which in turn is held stationary by outer die 60 and clamp 44.

Referring to FIG. 6, as wedge 71 moves further between the cages the planetating dies 46, 48 are expanded radially apart from one another to thereby stretch or radially expand an annular band of the tube metal at 76 over a stationary annular cutting die 78 which is also part of clamp 44. This shears the metal at 76, thereby cutting off a short metal tube 77 from the leading end of tube 36, tube 77 having its ends 62 and 76 flared outwardly at this point as shown in FIG. 6.

Referring to FIG. 7, wedge 71 continues to move axially between the cages, further expanding dies 46, 48 and causing them to cold work the metal of tube 77 by a roll forming action against outer die 60 to conform the metal to the profile of dies 46, 48 and 60 and thus form a wheel rim 80 (FIG. 7). Wedge 71 is then retracted (moved to the left as viewed in FIGS. 4–7), thereby drawing dies 46, 48 toward one another to the fully collapsed position of FIG. 4. Next, block 50 of annular die 60 is raised clear of rim 80 (FIG. 8) by collapsing toggle 58, after which platform 54 is moved horizontally toward the front of the machine to the load-unload position shown in FIG. 9, whereupon wheel rim 80 is readily accessible for vertical removal as indicated in phantom in FIG. 9 by suitable pincer or finger type apparatus well known in the art. Preferably, tube 36 remains clamped in device 44 during shifting of block 52, and its supporting carriage moves with block 52. The foregoing sequence is then repeated to form the next wheel rim from the next succeeding leading portion of tube 36.

In the method just described in connection with FIGS. 1–9, the rim is roll formed to its finished contour in one operation with only one set of dies. This eliminates the need to shift the work from one machine to another and thus avoids problems of handling and registering the work with a new die set in a different machine. However, it is within the scope of the invention to use more than one die set and to roll form the rim in progressive stages, e.g., to employ a first set having profiles corresponding to a desired intermediate profile for a wheel rim and a second die set having profiles corresponding to a desired final configuration for a wheel rim. In this case, the starting tube is formed to an intermediate profile by the steps of FIGS. 4–9, and these steps are repeated on the same tube using an annular die and rolling dies having the desired final profile.

An example of a modified method embodiment of the invention is illustrated by FIGS. 10A–10E. A metal tube 101 of a length and diameter required for a single wheel rim is first prepared. Tube 101 could be cut from a longer tube such as tube 36 (FIG. 2) or it could be made from sheet or coiled metal cut to strip size, rolled into a hoop and then butt welded to join its ends as shown in FIG. 10A.

Referring to FIGS. 10B and 10C, the ends 103 and 105 of tube 101 are flared as a preliminary forming step by forcing male dies 107 and 109 into the opposite ends of the tube a predetermined distance so that their frusto-conical surfaces 111 and 113 form tube 101 to the flared-end configuration shown in FIG. 10C. Flared tube 101 is then placed within an outer die 115 which has two or more die blocks 117 and 119 which are separable to open die 115 sufficiently to permit endwise loading of tube 101 with its flared ends 103 and 105. When die blocks 117, 119 are closed, inner surface 121 contacts tube 101 and holds it fixed against rotation.

A pair of planetary, expansible rolling dies 123 and 125 are positioned within tube 101 and revolved about the tube axis 127, preferably by supporting rolling dies 123, 125 in cages attached to a rotor and rotating the rotor as in the embodiment of FIGS. 1–9. A wedge 129, which may be identical to wedge 71, is rotated by the rotor at the speed of revolution of the cages and rolling dies and is simultaneously moved along axis 127 between the cages to thereby spread them apart and thus expand rolling dies 123, 125 radially outwardly into roll forming contact with tube 101. Further movement of wedge 129 between the cages to the position shown in FIG. 10E causes rolling dies 123, 125 to expand the metal of tube 101 against inner surface 121 of outer die 115, thus conforming tube 101 to the axial profile of the dies and thereby completing a wheel rim as in the embodiment of FIGS. 1–9. It is to be understood that the profiles are those desired for a drop center wheel rim, and that the profiles of die 115 and the rolling dies 123, 125 need not match exactly.

Further details of the rim manufacturing machine 42 for practicing the method and apparatus concepts of the invention are shown in FIGS. 11–18. Referring to FIG. 11, an electric motor 130 furnishes power for revolving, via a spindle and crosshead mechanism, rolling dies 46, 48 and for rotating wedge 71. Motor 130 rotates a pinion 132 which in turn rotates a gear 134 which is secured to a rotor or spindle 136 (FIG. 15) which is journaled by bearings 172 and 174 inside a stationary barrel-like housing 138 (FIG. 11) secured to frame 56. Referring to FIG. 15, gear 134 rotates rotor 136 about axis 47 and rotor 136 in turn revolves cages 72, 74 and rolling dies 46, 48 and rotates wedge 71. Wedge 71 is reciprocated; i.e., driven forward and then retracted along axis 47, by a hydraulic ram 140 (FIGS. 11–13). Toggle linkage 58 is operated by another hydraulic ram 142, and a third hydraulic ram 144 moves platform 54 horizontally in and out of the machine as described previously. Rams 140, 142 and 144 are controlled by suitable control mechanism and circuits evident to one skilled in the art and hence not shown herein.

Machine 42 is supported on a base 146 resting on I-beams 148 and 150 (FIGS. 3, 11 and 14) lying on flooring 152 (FIGS. 11 and 14). A floor-mounted stand 154 (FIG. 11) supports the rear of ram 140 and another stand 156 mounted on housing 138 supports ram 142. Ram 140 and the shaft 170 for driving wedge 71 are carried by a frame 158 (FIGS. 11, 12 and 13) which is supported by a base-mounted stand 159.

FIG. 14 is a front elevational view of machine 42 with clamp 44 removed and die blocks 50 and 52 shown in phantom to more clearly show cages 72 and 74 which carry rolling dies 46 and 48, which are partially visible behind front cover plates 160 and 162 of cages 72 and 74 respectively. Also, as best seen in FIG. 14, housing 138 has a pair of arms 180 and 182 by which the housing is hung from the uprights of frame 56.

Referring in more detail to FIGS. 12 and 13, a plunger 190 of ram 140 threadably receives on its outer end a head 192 which is slidably keyed on horizontal ways 194 and 196 of frame 158 at the rear of the machine. The rear end of shaft 170 is received in a bearing cavity 198 of head 192 and carries a radial and axial thrust bearing assembly 200 thereon. Bearing 200 is restrained between a cap plate 202 secured to the end of shaft 170 and a cap plate 204 affixed to the end face of head 192. With this coupling arrangement, shaft 170 is free to rotate relative to ram plunger 190 but is connected in driven relation with shaft 190 for reciprocation along axis 47 by ram 140.

As best seen in FIGS. 12 and 13, the length of the stroke of wedge 71 is adjustable by suitably positioning a nut 206 threadably received on threads 208 of shaft 170. Nut 206 is adapted to strike the arm 210 of a limit switch 212 at the desired forward limit of the stroke of wedge 71. Switch 212 is connected by suitable circuitry to the hydraulic controls of ram 140 and is adapted to reverse the ram so that it retracts shaft 170 and hence wedge 71 upon being so actuated.

The details of the rotor, wedge and cage mechanism for supporting and actuating rolling dies 46, 48 are best seen in FIGS. 15–18. Rotor 136 comprises a cylindrical casting having a rear hub plate 137 to which gear 134 is fixed. An enlarged crosshead 220 is integrally formed on the forward end of rotor 136 which has a diametrically extending guideway 222 across its end face in which the cages or baskets 72 and 74 are slidably received for movement radially of rotor 136. A keyway 224 is formed in each of the side faces defining guideway 222 which slidably receives a key 226 fixed to cages 72, 74 in a recess 228 in the side thereof (FIG. 17) to thereby slidably key each cage for movement radially of the crosshead while preventing axial movement relative to the crosshead.

Each cage 72, 74 comprises a bearing block basket or frame 230 (FIGS. 17 and 18) with bearing cavities at each end for receiving suitable bearing assemblies 232, 234 (FIG. 15) therein, cover plates 236 and 238 (FIG. 17) being fixed to frame 230, plate 236 completing the outer raceway for bearing assembly 234. Bearings 232, 234 respectively support stub shafts 240 and 242 of the rolling dies 46, 48 to thereby journal the rolling dies in the cage. The center of each cage 72, 74 is open to expose the full length and approximately half of the circumference of each rolling die for working engagement with the rim blank in the roll forming operation. Suitable clearance cavities 244 are provided in frame 230 to clear the drop center portion of the wheel rim. The sides of each frame 230 are also cut away to form inclined guideways 246 and 248, one on each opposite side of the cage (FIGS. 17 and 18). The recessed vertical faces 250 and 252 of frames 230 are respectively provided with recessed keyways 254 and 256 extending parallel to guideways 246, 248.

Wedge 71 comprises a pair of parallel side plates 260 and 262 (FIG. 16) each having tapered edges 264 and 266 (FIG. 15) adapted to slidably engage the complemental cage guideways 246 or 248 disposed on the same sides of cages 72 and 74 for wedging the cages apart in response to movement of wedge 71 to the right as viewed in FIG. 15. Plates 260 and 262 are interconnected by a cross plate 268 near their midsection and by a U-shaped brace 270 (FIG. 15) fixed to the forward end of shaft 170. Wedge 71 is slidably supported for movement axially within rotor 136 by a pair of parallel guide plates 272 and 274 welded to the inner periphery of rotor 136 (FIG. 16), the outer faces of wedge plates 260 and 262 sliding against the adjacent inner faces of guide plates 272, 274 respectively. In addition, another pair of spaced parallel guide plates 276 and 278 (FIGS. 15 and 16) are mounted on pedestal bosses 280 within rotor 136, perpendicular to plates 260, 262, to provide guideways within which brace 270 is adapted to slide. With this arrangement wedge 71 is braced in all directions radially of rotor 136 but is free to slide axially of the rotor.

Each plate 260, 262 has a pair of inclined ribs 282 and 284 (FIGS. 15 and 16) projecting inwardly therefrom and extending parallel to edges 266 and 264 respectively. Ribs 282 and 284 are slidably received in keying engagement with keyways 254 disposed on the same sides of cages 72 and 74 and thus provide positive engagement of wedge 71 with cages 72 and 74 so that the cages are retracted toward one another in response to movement of wedge 71 to the left as viewed in FIG. 15.

With the above-described operating mechanism, torque is transmitted from gear 134 to the cages 72 and 74 entirely via rotor 136 and crosshead 220 to produce the forces required to revolve dies 46 and 48 during the previously described roll forming operation. The radial expansion forces required to spread the dies apart radially of the crosshead are developed in ram 140 and transmitted solely through shaft 170, wedge 71 and cages 72 and 74 to the associated rolling dies 46 and 47. Since the rolling dies 46, 48 are isolated from wedge 71 and crosshead 220 by their respective cages, wear of the dies is limited to that resulting solely from engagement of the dies with the rim metal being worked. In addition, since the dies are supported at both ends in roller bearings, radial thrust loads are uniformly applied from the wedge to the dies, and the cantilever mount of the cages on the crosshead is reinforced by the progressive entrance of the wedge between the cages.

From the foregoing description it will now be evident that the present invention provides a rapid and reliable method and apparatus for making wheel rims and is readily adaptable to mass production and automated equipment. By providing rim blanks initially in the form of a long tube 36, in lengths of say fifteen feet, and forming a multiplicity of rims successively from such a blank, product uniformity is improved. The step of individually cutting off short tubes 77 from the long tube blank 36 during initial expansion of the roll forming dies also provides a reduction in both equipment and handling costs. The use of diametrically opposed and oppositely expanding rolling dies 46 and 48 in conjunction with a stationary outer die 60 or 115 insures that the resulting wheel rim is roll formed to a high degree of roundness, thereby eliminating the need for a subsequent sizing operation. Moreover, due to the fact that the rim is held stationary in the outer die 60, 115 and dies 46 and 48 are free to rotate about their individual axes, very little scrubbing occurs due to relative sliding movement between the dies and the rim metal, resulting in an enhanced surface finish on both the interior and exterior of the rim and in a reduction of die wear. The wheel rim resulting from the method and apparatus of the invention is also characterized by a contour which very accurately matches the die profiles so that very little, if any, subsequent machining or finishing operations are required on the rim. Due to the sequence of horizontal and vertical motions of the split movable die 60, loading, clamping, and unloading is achieved in a rapid manner with a minimum of die motion, thereby simplifying the die actuating mechanism and conserving on space.

I claim:
1. A method of manufacturing wheel rims comprising the steps of:
   (1) providing a rim blank in the form of a tube having a length in excess of that required to form a wheel rim therefrom,
   (2) feeding said tube endwise to bring the leading end thereof into an opened separable outer die adapted to impart a desired exterior contour to the blank when the same is roll formed thereagainst,
   (3) closing said outer die in encircling clamping relation onto the exterior of said leading end of said tube and then maintaining said die stationary,
   (4) providing a shearing die closely encircling said leading end of the blank adjacent the entrance side of said outer die,
   (5) positioning within the leading end of said blank a plurality of freely rotatable rolling dies adapted to impart the interior contour of the finished rim to the blank when expanded and revolved therein,
   (6) revolving and expanding said rolling dies against the interior surface of the blank to expand the same against said shearing die and thereby sever a section of said blank having the proper length for formation into a single wheel rim and then roll form said severed section against said outer die,
   (7) and thereafter retracting said rolling dies and opening said outer die for removal of the rolled rim.

2. The method set forth in claim 1 wherein said tube provided in step (1) has a length sufficient for severing into a multiplicity of said sections, and further including the step of repeating steps (2) through (7) of claim 1 with successive feeding of said tube endwise until the same is consumed to thereby produce a succession of wheel rims from said tube.

3. The method of making a plurality of wheel rims as set forth in claim 2 wherein step (1) comprises forming said tube from a length of coil strip stock by feeding the strip lengthwise through a progressive roll tube making machine adapted to curl the side edges of the strip toward one another as the strip is fed lengthwise through progressive roll stations and to butt weld said edges together to form said rim blank tube.

4. In a machine for making wheel rims the combination comprising a multi-part separable outer die having an inner periphery adapted in closed condition of the die to impart a desired exterior contour to a rim blank when roll formed thereagainst, said outer die comprising upper die block means movable in a vertical plane between a lowered closed and a raised open position, lower die block means movable horizontally between a rim forming position in closed registry with said upper die block means and a blank loading-rim unloading position offset horizontally from the plane of movement of said upper die block means, roll forming means including a pair of mutual reaction freely rotatable rolling dies, means for revolving said rolling dies within the confines of said outer die in its closed condition and about an axis coincident with the axis of said outer die and for spreading and retracting said rolling dies radially of said axis, a shearing die disposed adjacent the entrance side of said outer die and concentric therewith, said shearing die having a cutting edge adapted to sever the rim blank during initial roll forming expansion thereof by said rolling dies, and means for operating said combination in the following sequence: retracting said rolling dies toward one another so that the same are spaced radially inwardly from the inner periphery of the outer die in its closed condition, elevating said upper die block means from closed to open position thereof, moving said lower die block means from the closed to the loading-unloading position thereof, moving said lower die block means back beneath the upper die block means to its rim forming position, lowering said upper die block means into closed relation with said lower die block means and revolving and spreading said rolling dies radially of said axis into roll forming cooperation with said outer die relative to a radially interposed rim blank.

5. A machine for manufacturing wheel rims comprising an outer die, means for placing and holding a metal tube within said outer die, roll forming means including at least one rolling die, means for supporting said roll forming means for revolving said rolling die about an axis at the center of said outer die while allowing said rolling die to freely rotate about its own axis offset from and parallel to said axis of revolution, said rolling die having a circumferential surface profile axially thereof corresponding to a desired configuration for a wheel rim, said outer die having an inner surface with a profile axially thereof generally inversely matching that of said rolling die, means including an operating member movable in the direction of said axis of revolution adapted to move said support means away from said axis of revolution so that said rolling die expands metal of said tube against said annular die to conform the metal to the profile of said dies, and a cutter die located adjacent said outer die and having a circular shearing edge disposed coaxial with said outer die such that as said rolling die expands metal of the rim blank said cutter die shears the metal to thereby cut the blank to proper length for subsequent roll forming to the profile of said dies.

References Cited

UNITED STATES PATENTS

| | | | |
|---|---|---|---|
| 301,130 | 7/1884 | Kollberg | 72—71 |
| 2,933,124 | 4/1960 | Benson et al. | 72—117 |
| 3,290,914 | 12/1966 | Vaill et al. | 72—117 |

CHARLES W. LANHAM, *Primary Examiner.*

L. A. LARSON, *Assistant Examiner.*